US009881560B2

(12) United States Patent
Kato

(10) Patent No.: US 9,881,560 B2
(45) Date of Patent: Jan. 30, 2018

(54) IMAGE-CAPTURE APPARATUS CONTROLLING DISPLAY AT PHOTOGRAPHING TIME, IMAGE-CAPTURE CONTROL METHOD, AND NON-TRANSISTORY COMPUTER-READABLE RECORDING MEDIUM

(71) Applicant: CASIO COMPUTER CO., LTD., Shibuya-ku, Tokyo (JP)

(72) Inventor: Yoshiyuki Kato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 75 days.

(21) Appl. No.: 14/220,030

(22) Filed: Mar. 19, 2014

(65) Prior Publication Data

US 2014/0285699 A1  Sep. 25, 2014

(30) Foreign Application Priority Data

Mar. 21, 2013 (JP) ................................ 2013-058759

(51) Int. Cl.
*H04N 5/262* (2006.01)
*G09G 3/34* (2006.01)
(Continued)

(52) U.S. Cl.
CPC .......... *G09G 3/3406* (2013.01); *G09G 5/003* (2013.01); *H04N 5/2252* (2013.01);
(Continued)

(58) Field of Classification Search
CPC .. G09G 3/3406; G09G 5/003; H04N 5/23293; H04N 5/2354; H04N 5/2252
(Continued)

(56) References Cited

U.S. PATENT DOCUMENTS 7,015,968 B2 * 3/2006 Ong .................... H04N 1/00127
348/370
7,391,445 B2 * 6/2008 Herberger ............. G06T 1/0007
348/239
(Continued)

FOREIGN PATENT DOCUMENTS

JP  09-065181 A  3/1997
JP  2001-305637 A  11/2001
(Continued)

OTHER PUBLICATIONS

Japanese Office Action dated Dec. 24, 2014, issued in counterpart Japanese Application No. 2013-058759.
(Continued)

*Primary Examiner* — Ngoc-Yen Vu
(74) *Attorney, Agent, or Firm* — Holtz, Holtz & Volek PC

(57) ABSTRACT

An image-capture unit of an image-capture apparatus captures an image of a subject. A display unit can be disposed in a range where emission light from the display unit reaches the subject whose image is captured by the image-capture unit and can display the image using the emission light. An emission light control unit executes control for changing at least one of a display content and a display state of an image displayed on the display unit at a time of photographing in consideration of an influence of the emission light (irradiation light) from the display unit on a photographing state of the subject.

13 Claims, 9 Drawing Sheets

(51) Int. Cl.
   *H04N 5/232* (2006.01)
   *G09G 5/00* (2006.01)
   *H04N 5/225* (2006.01)
   *H04N 5/235* (2006.01)
   *H04N 5/222* (2006.01)

(52) U.S. Cl.
   CPC ....... *H04N 5/2354* (2013.01); *H04N 5/23293* (2013.01); *H04N 5/2621* (2013.01)

(58) Field of Classification Search
   USPC .................................................. 348/333.12
   See application file for complete search history.

(56) References Cited

U.S. PATENT DOCUMENTS

| | | | | |
|---|---|---|---|---|
| 7,652,693 B2 * | 1/2010 | Miyashita | ............ | H04N 1/0044 348/218.1 |
| 7,663,691 B2 * | 2/2010 | Ciudad | ................ | H04N 5/2354 348/216.1 |
| 7,705,874 B2 * | 4/2010 | Du Breuil | ............ | H04N 7/142 348/14.01 |
| 7,965,859 B2 * | 6/2011 | Marks | .................. | H04N 5/2226 345/84 |
| 8,582,919 B2 * | 11/2013 | Hatfield | .................. | G06T 11/60 382/100 |
| 9,013,627 B2 * | 4/2015 | Ko | ....................... | H04N 5/2256 348/222.1 |
| 9,442,346 B2 * | 9/2016 | Gantz | .................... | A45C 11/00 |
| 9,513,724 B2 * | 12/2016 | Hirsch | .................... | G06F 3/038 |
| 2006/0285164 A1 * | 12/2006 | Wang | .................... | G06T 15/503 358/3.01 |
| 2008/0102888 A1 * | 5/2008 | Sellgren et al. | ........... | 455/556.1 |
| 2010/0020008 A1 | 1/2010 | Kobayashi et al. | | |
| 2010/0194961 A1 * | 8/2010 | Patel | ........................ | 348/333.01 |
| 2011/0117959 A1 * | 5/2011 | Rolston | .................... | A46B 7/04 455/556.1 |
| 2015/0002735 A1 * | 1/2015 | Moskovchenko | ... | H04N 5/2354 348/370 |

FOREIGN PATENT DOCUMENTS

| | | |
|---|---|---|
| JP | 2004180245 A | 6/2004 |
| JP | 2005286440 A | 10/2005 |
| JP | 2007183512 A | 7/2007 |
| JP | 2010-32732 A | 2/2010 |
| JP | 2011-071680 A | 4/2011 |
| TW | 200411316 A | 7/2004 |

OTHER PUBLICATIONS

Chinese Office Action (and English translation thereof) dated Nov. 2, 2016, issued in counterpart Chinese Application No. 201410101364.9.

* cited by examiner

LIGHT-BLOCKING MASK

IMAGE-CAPTURE APPARATUS CONTROLLING DISPLAY AT PHOTOGRAPHING TIME, IMAGE-CAPTURE CONTROL METHOD, AND NON-TRANSISTORY COMPUTER-READABLE RECORDING MEDIUM

This application is based upon and claims the benefit of priority from the prior Japanese Patent Application No. 2013-058759, filed Mar. 21, 2013, and the entire contents of which are incorporated herein by reference.

BACKGROUND OF THE INVENTION

Field of the Invention

The present invention relates to an image-capture apparatus controlling display at photographing time, an image-capture control method, and a program (recording medium).

Related Art

An image-capture apparatus having a display unit has conventionally been used widely. In such an image-capture apparatus, a live view image is often displayed in a display unit even before the image capture for recording is instructed.

In view of this, a photographer determines the composition while viewing a live view image displayed in a display unit, and then instructs the image-capture for the recording by pressing a shutter button, for example. A technique for changing the luminance of the display unit in accordance with the ambient environment at the image-capture for the purpose of enhancing the visibility of the live view image for the photographer is disclosed in, for example, JP-A-H-9-65181 and JP-A-2001-305637.

Moreover, a technique for controlling the luminance or the color temperature of a backlight of an LED (Light Emitting Diode) of a conventional liquid crystal display apparatus according to the environmental light and the like to be employed as the display unit as above is disclosed in, for example, JP-A-2010-32732 and JP-A-2011-71680.

By the way, there have been more requests for photographing a subject more beautifully by the use of a so-called beauty function, for example. Such requests have already been fulfilled by the use of a special image-capture apparatus such as an automatic image-capture machine installed on the streets or the station yard; for example, a person is photographed while being irradiated with intense light so that the shadow on the face is reduced, whereby the stain or wrinkle on the face becomes less visible. When the composition or the condition of the face is checked in the image-capture apparatus installed at the place where the environmental light changes largely, it is effective to enhance the visibility of the live view image by the use of the above conventional technique.

SUMMARY OF THE INVENTION

An aspect of the present invention is
an image-capture apparatus including:
an image-capture unit that captures an image of a subject;
a display unit that can be disposed in a range where emission light reaches the subject whose image is captured by the image-capture unit and that can display an image captured by the image-capture unit using the emission light; and
an emission light control unit that executes control for changing at least one of a display content and a display state of the image displayed in the display unit at photographing time in consideration of an influence of the emission light from the display unit on a photographing state of the subject.

Another aspect of the present invention is an image-capture control method for executing control for an image-capture apparatus including
an image-capture unit that captures an image of a subject, and
a display unit that can be disposed in a range where emission light reaches the subject whose image is captured by the image-capture unit and that displays the image using the emission light,
the method comprising:
a step of controlling the emission light for executing control for changing at least one of display content and a display state of an image displayed in the display unit at the photographing time in consideration of an influence of the emission light from the display unit on a photographing state of the subject.

Another aspect of the present invention is
a non-transitory recording medium recording a program for allowing a computer to function as an emission light control unit, the computer executing control for an image-capture apparatus including
an image-capture unit that captures an image of a subject, and
a display unit that can be disposed in a range where emission light reaches the subject whose image is captured by the image-capture unit and that displays the image using the emission light, wherein
the emission light control unit executes control for changing at least one of display content and a display state of an image displayed in the display unit at the photographing time in consideration of an influence of the emission light from the display unit on a photographing state of the subject.

DETAILED DESCRIPTION OF THE INVENTION

Embodiments of the present invention are hereinafter described with reference to the drawings.

[First Embodiment]

FIG. 1 are plan views depicting an external structure of an image-capture apparatus according to a first embodiment of the present invention.

Figure 1A:
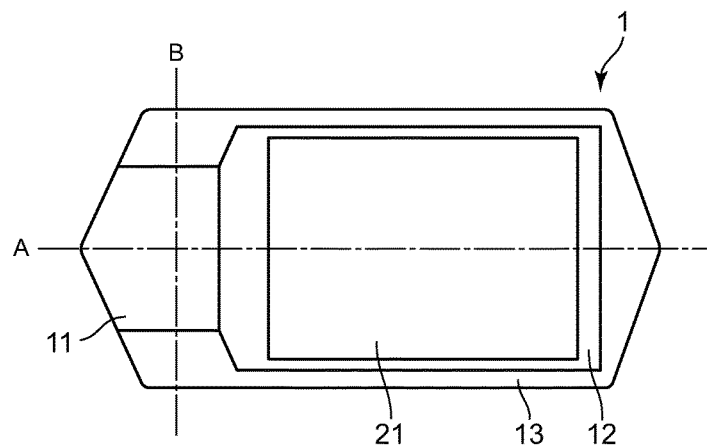
FIG. 1A and FIG. 1B are plan views depicting an external structure of an image-capture apparatus according to an embodiment of the present invention.

Specifically, FIG. 1A is a plan view depicting the external structure of the image-capture apparatus in which an image-capture plane and a display plane are disposed to face each other.

Figure 1B:
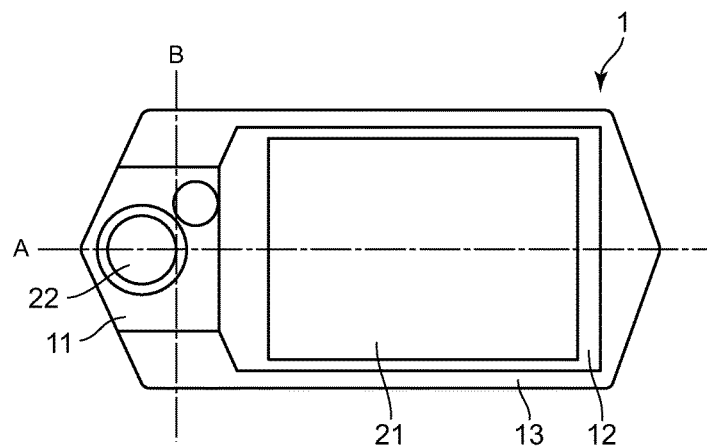

FIG. 1B is a plan view depicting the external structure of the image-capture apparatus in which the image-capture plane and the display plane are disposed on the same plane.

An image-capture apparatus 1 is composed of, for example, a digital camera, and can perform a series of processes from capturing an image of a subject, which corresponds to a user, on the basis of a predetermined operation of the user for indicating a timing of releasing a shutter to recording the resulting image (hereinafter called "captured image").

In this manner, the recording of the data of the captured image is triggered by the predetermined operation of the user. The operation that triggers the recording as above is hereinafter referred to as "image-capture recording instruction". Moreover, a series of processes based on the image-capture recording instruction is hereinafter called "image-capture process by image-capture recording instruction".

The image-capture apparatus 1 includes a camera main body 11, a display unit main body 12, and a frame main body 13, which are used for executing the image-capture process by the image-capture recording instruction.

The camera main body 11 is formed to have a short columnar shape that is pentagonal when viewed from above. As depicted in FIG. 1A, the back surface of the camera main body 11 is formed to be flat. As depicted in FIG. 1B, the front surface of the camera main body 11 is provided with an image-capture plane (plane on the image-capture lens side) of an image-capture unit 22. In other words, the camera main body 11 constitutes a housing for having the image-capture unit 22 incorporated therein.

The camera main body 11 is pivotally supported to the display unit main body 12 so that the camera main body 11 can rotate with a rotation axis A, which is set penetrating through the camera main body 11, as a center of rotation.

Moreover, the camera main body 11 is pivotally supported to the frame main body 13 so that the camera main body 11 can rotate with a rotation axis B, which is set penetrating through the camera main body 11 in a direction orthogonal to the rotation axis A, as a center of rotation.

More specifically, the camera main body 11 is structured to be able to rotate around the rotation axis A while having one of five sides of the pentagonal camera main body 11 in sliding contact with the display unit main body 12.

Note that the side of the image-capture apparatus 1 on which the camera main body 11 is disposed (left side in FIG. 1) is called "camera side", and the side thereof on which the display unit main body 12 is disposed (right side in FIG. 1, i.e., particularly the side opposite to the side facing the camera main body 11) is called "display unit side".

The display unit main body 12 is formed to have an approximately rectangular shape when viewed from above, and the display plane of the display unit 21 that is rectangular is disposed at the center of the surface of the display unit main body 12. In other words, the display unit main body 12 constitutes a housing having the display unit 21 incorporated therein.

The frame main body 13 includes a bottom and two parallel arms extended in a direction approximately orthogonal to the bottom at both ends of the bottom, the bottom and the arms forming the shape like a letter of U when viewed from above.

The bottom of the frame main body 13 protrudes like a letter of V in a direction (display unit side) opposite to the direction where the two arms of the frame main body 13 extend.

The frame main body 13 is rotatably connected to the camera main body 11 so as to be able to rotate around the rotation axis B. In other words, the camera main body 11 is pivotally supported with the rotation axis B, which is disposed between the ends of the two arms of the frame main body 13, as a center of rotation.

Therefore, the camera main body 11 is pivotally supported to the frame main body 13 in a state that the opposite two sides out of the five sides of the pentagon are in contact with the two arms of the frame main body 13. Therefore, the camera main body 11 can rotate while having the opposite two sides in sliding contact with the two arms of the frame main body 13.

In this manner, the camera main body 11 is pivotally supported to the frame main body 13 so as to be able to rotate; therefore, the direction of the display plane on which the image-capture plane of the image-capture unit 22 is disposed can be changed freely. In other words, a user rotates the camera main body 11; thus the user can dispose the image-capture plane of the image-capture unit 22 at the back side relative to the paper surface as depicted in FIG. 1A or dispose the image-capture plane of the image-capture unit 22 at the front side relative to the paper surface as depicted in FIG. 1B.

Therefore, when the subject exists at the back side, the user rotates the camera main body 11 around the rotations axis B to produce the state of FIG. 1A; thus, the user can capture the image of the subject at the back side with the image-capture unit 22.

In contrast to this, when the subject exists at the front side, for example, when the user captures the image of the user himself (hereinafter called "selfie"), the user rotates the camera main body 11 around the rotation axis B to produce the state of FIG. 1B; thus, the user can capture the image of the subject at the front side with the image-capture unit 22.

Figure 2:
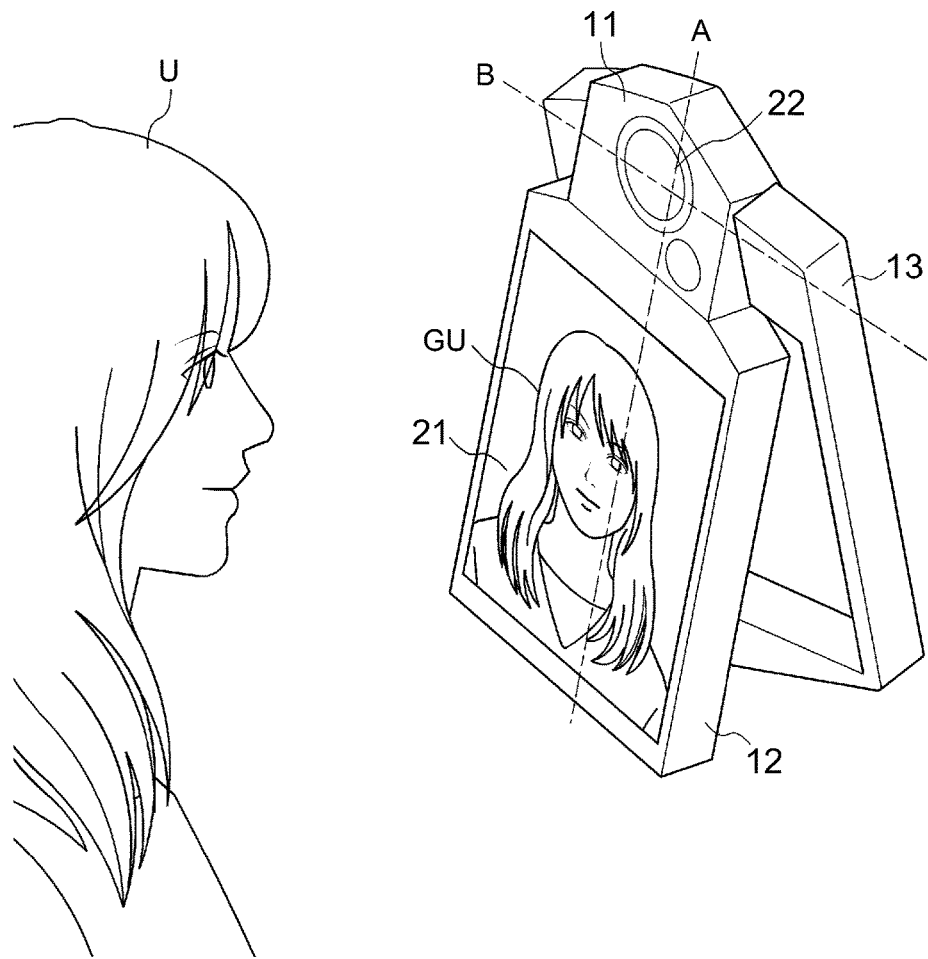
FIG. 2 is a perspective view depicting an external structure of the image-capture apparatus of FIG. 1, which is set to stand on a desk, etc.

FIG. 2 is a perspective view depicting the external structure of the image-capture apparatus 1 set to stand on the desk, for example.

A user U, in the case of taking the selfie, has the image-capture apparatus 1 stand on the desk in the state that the camera main body 11 and the frame main body 13 are opened at a predetermined angle while the direction where the display unit 21 displays and the direction where the image-capture unit 22 captures the image are made to substantially coincide with each other as depicted in FIG. 2.

Here, the direction where the display unit 21 displays refers to the direction of a normal line of the display plane of the display unit 21 where light (light emitted from each pixel) is emitted from the display plane. The direction where the image-capture unit 22 captures the image refers to the direction of a normal line of the image-capture plane of the image-capture unit 22 (i.e., the direction of the optical axis), which corresponds to the direction from the image-capture plane toward the subject.

Thus, the protruding end of the bottom with the shape of the letter V in the frame main body 13 and the end of the display unit main body 12 function as the base of the image-capture apparatus 1 according to this embodiment. This base is in contact with the surface of the desk and the frame main body 13 and the display unit main body 12 are pivotally supported to each other via the rotation axis B, whereby the image-capture apparatus 1 stands on the desk, for example.

After having the image-capture apparatus 1 stand on the desk, the user U faces the image-capture plane of the image-capture unit 22 and then moves to the position where the user can view the whole display unit 21.

Then, as depicted in FIG. 2, the images of the user U are sequentially captured, and a live view image GU is displayed in the display unit 21.

Here, the live view image GU is described.

The image-capture apparatus 1 continues the image-capture operation for the subject (user U in the example of FIG. 2) by the image-capture unit 22. Then, while the image-capture operation for the subject by the image-capture unit 22 is continued, the image-capture apparatus 1 temporarily stores the data of the captured images (frames) sequentially output from the image-capture unit 22 in the memory (in this embodiment, in a storage unit 48 of FIG. 3, which is described later). Such a series of control processes is hereinafter referred to as "live view image-capture process".

The image-capture apparatus 1 sequentially reads out the pieces of data recorded temporarily in the memory during the live view image-capture process, and sequentially displays the corresponding captured images (frames) in the display unit 21. Such a series of control processes is hereinafter referred to as "live view display process".

The captured image displayed in the display unit 21 as a result of the above live view image-capture process and live view display process corresponds to the live view image GU.

The user U decides when to release the shutter while viewing the live view image GU. Then, the user outputs the image-capture recording instruction at the desired timing of releasing the shutter.

The image-capture apparatus 1 records the data of the captured image (frame) output from the image-capture unit 22 just after the image-capture recording instruction in a memory for storage (in this embodiment, the memory is a removable medium 61 of FIG. 3, which is described later).

The operation of photographing by the image-capture apparatus 1 after the image-capture recording instruction, i.e., the operation of photographing for storage is hereinafter called "actual photographing" to be distinguished from the photographing of the live view image.

Here, in this embodiment, the liquid crystal display apparatus is employed as the display unit 21, and the back side thereof (plane opposite to the display plane) is provided with a backlight (in this embodiment, a backlight unit 51 of FIG. 3, which is described later). The luminance (brightness) of the backlight can be freely adjusted.

Thus, in the image-capture apparatus 1 of this embodiment, the luminance of the backlight is set to the luminance appropriate for the finder before the actual photographing (before the image-capture recording instruction is given) as conventional, and the live view image is displayed in the display unit 21.

On the other hand, in the image-capture apparatus 1, the luminance of the backlight is set to be a little higher in the exposure period at the actual photographing time after the image-capture recording instruction is given.

Here, the luminance of the backlight during the exposure period at the actual photographing time is set to be a little higher for the purpose of brightening the face of the person as the subject in the actual photographing time, thereby reducing the shadow from the face or making the stain or wrinkle on the face less visible. Therefore, the luminance of the image-capture apparatus 1 does not need to be extremely high, differently from a xenon flash lamp that emits a large amount of light, and may be higher than the luminance of a general monitor.

The period where the high luminance is set may not be very long in order to prevent the subject from feeling dazzling, and may be sufficient in the range where the brightened face (face from which the shadow is removed) can be taken in the captured image to be stored. For this reason, in this embodiment, the luminance is set high only in the exposure period at the actual photographing time as aforementioned.

In this embodiment, the image-capture process by the image-capture recording instruction is executed by the image-capture apparatus 1.

Figure 3:
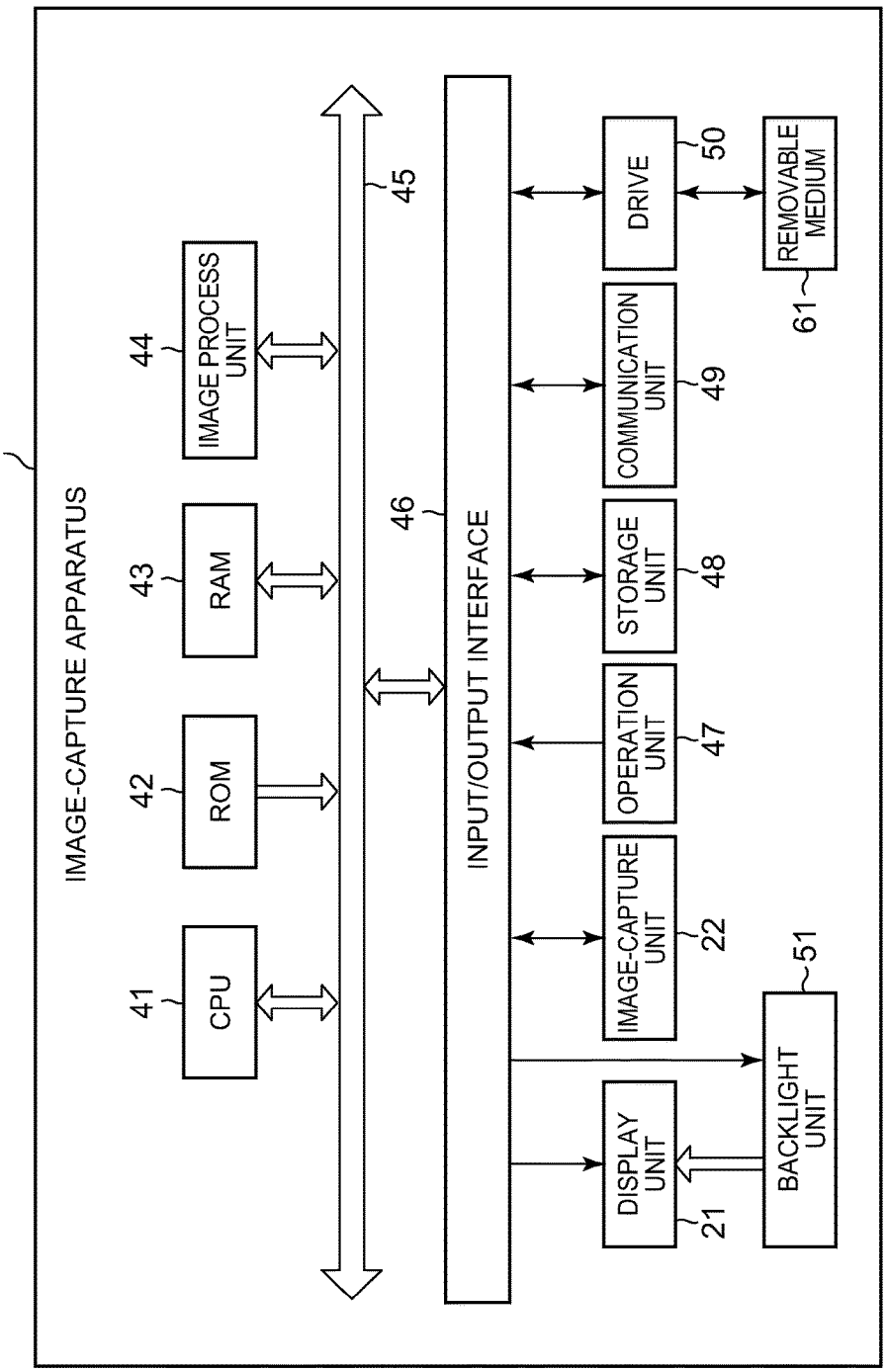
FIG. 3 is a block diagram depicting a structure of hardware of the image-capture apparatus of FIG. 1.

FIG. 3 is a block diagram depicting a hardware structure of the image-capture apparatus 1 capable of executing the image-capture process by the image-capture recording instruction.

In addition to the aforementioned display unit 21 and image-capture unit 22, the image-capture apparatus 1 includes a CPU (Central Processing Unit) 41, a ROM (Read-Only Memory) 42, a RAM (Random Access Memory) 43, an image process unit 44, a bus 45, an input/output interface 46, an operation unit 47, a storage unit 48, a communication unit 49, a drive 50, and a backlight unit 51.

The CPU 41 executes various processes in accordance with a program stored in the ROM 42 or a program loaded from the storage unit 48 to the RAM 43.

The RAM 43 stores the data necessary in execution of the various processes of the CPU 41 as appropriate.

The image process unit 44 is composed of a DSP (Digital Signal Processor), a VRAM (Video Random Access Memory), or the like, and works with the CPU 41 to perform various image processes on the image data.

For example, the image process unit 44 performs the image processes, such as the noise reduction, the white balance adjustment, or the camera shake correction, on the data of the captured image output from the image-capture unit 22.

The CPU 41, the ROM 42, the RAM 43, and the image process unit 44 are mutually connected via the bus 45. This bus 45 is also connected to the input/output interface 46. The input/output interface 46 is connected to the display unit 21, the image-capture unit 22, the operation unit 47, the storage unit 48, the communication unit 49, the drive 50, and the backlight unit 51.

The display unit 21 is composed of a liquid crystal display apparatus capable of displaying various images including the captured image in this embodiment.

The image-capture unit 22 includes an optical lens unit and an image sensor, which are not shown.

The optical lens unit is composed of a lens for focusing light, such as a focus lens or a zoom lens, for photographing the subject.

The focus lens is a lens for focusing a subject image on the light reception plane of the image sensor.

The zoom lens is a lens for freely changing the focal distance in a certain range.

The optical lens unit is further provided with a peripheral circuit for adjusting the setting parameters of the focal point, the exposure, the white balance, or the like as necessary.

The image sensor is composed of a photoelectric conversion device, an AFE (Analog Front End), and the like.

The photoelectric conversion device is composed of, for example, a CMOS (Complementary Metal Oxide Semiconductor) type photoelectric conversion device. The photoelectric conversion device receives the subject image from the optical lens unit. Upon the reception of the subject image, the photoelectric conversion device conducts the photoelectric conversion of the subject image (captures the image) and accumulates the image signals for a certain period, and then supplies the accumulated image signals to the AFE as the analog signals sequentially.

The AFE executes various signal processes such as the A/D (Analog/Digital) conversion processes for the analog image signals. Through the various signal processes, the digital signals are generated and then output as the output signals of the image-capture unit 22.

The output signals of the image-capture unit 22 correspond to the data of the captured image, and are supplied to the CPU 41, the image process unit 44, or the like as appropriate.

The operation unit 47 is composed of any kind of buttons, for example release buttons, which is not shown, and accepts the instruction from the user.

The storage unit 48 is composed of, for example, a DRAM (Dynamic Random Access Memory), and stores the data of various images such as the live view image.

The communication unit 49 controls the communication with another apparatus via the network such as the Internet.

The drive 50 has the removable medium (removable medium) 61 such as a magnetic disk, an optical disk, an optomagnetic disk, or a semiconductor memory attached thereto as appropriate. The program read out from the removable medium 61 by the drive 50 is installed in the storage unit 48 as necessary. The removable medium 61 can also store the various data such as the data of the image stored in the storage unit 48 in a manner similar to the storage unit 48.

Note that the data of the captured image at the actual photographing time can be stored in the storage unit 48 as a matter of course; however, in order to clearly distinguish this storage from the temporal storage of the live view image, the data are stored in the removable medium 61 in this embodiment.

The backlight unit 51 uses an LED (Light Emitting Diode) as a light source and illuminates the liquid crystal of the display unit 21 from the back via a light guide plate in this embodiment, for example.

The luminance of the light from the backlight unit 51 can be variously changed as aforementioned.

Note that any apparatus can be employed as the backlight unit 51 as long as the luminance of the light can be variously changed. The light source is not limited to the LED and may be a cold cathode tube. The type is not limited to the edge light type and may be another direct type.

In this embodiment, however, LEDs of RGB are employed as the light source of the backlight unit 51, so that the tone of color can also be variously changed in addition to the luminance of the light from the backlight unit 51.

Figure 4:
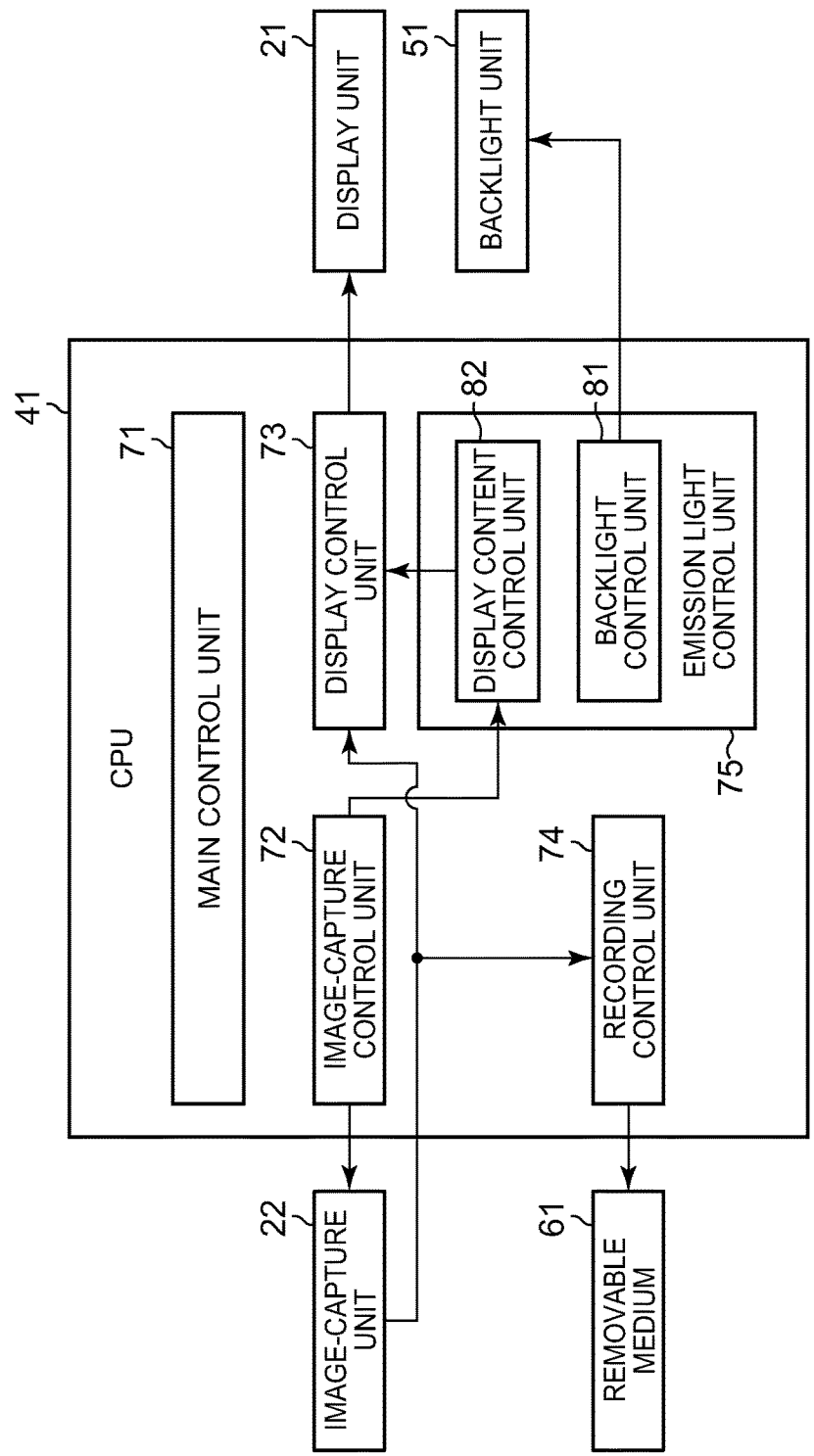
FIG. 4 is a functional block diagram depicting the functional structure that enables the execution function of the image-capture process by an image-capture recording instruction out of the functions of the image-capture apparatus of FIG. 3.

FIG. 4 is a functional block diagram depicting the functional structure for executing the image-capture process by the image-capture recording instruction among the functions of the image-capture apparatus 1 with the hardware structure as above.

In the case of executing the image-capture process by the image-capture recording instruction, a main control unit 71, an image-capture control unit 72, a display control unit 73, a recording control unit 74, and an emission light control unit 75 function in the CPU 41.

The main control unit 71 controls the operation of the entire image-capture apparatus 1; above all, the main control unit 71 controls the operation in the execution of the image-capture process by the image-capture recording instruction.

The image-capture control unit 72 controls the operation of the image-capture by the image-capture unit 22. In other words, the image-capture unit 22 captures (exposes) the image of the subject on the basis of the control of the image-capture control unit 72, and outputs the data of the captured image.

The display control unit 73 executes the control for displaying the various images including the live view image in the display unit 21.

The recording control unit 74 functions upon the image-capture recording instruction, and executes the control for recording the data of the captured images output from the image-capture unit 22 after the image-capture recording instruction, i.e., the data of the captured images at the actual photographing time in the removable medium 61 as the data for storage.

In the case where the image-capture unit 22 captures the image in the state that the direction where the display unit 21 displays approximately coincides with the direction where the image-capture unit 22 captures the image (for example, the state of FIG. 2), the emission light control unit 75 controls at least one of the display content and the display state of the image displayed in the display unit 21 in consideration of the influence of the emission light from the display unit 21 on the photographing state of the subject.

In other words, the display unit 21 displays the image by emitting light per unit pixel on the basis of the light from the backlight unit 51. The emission light for each pixel enters the user's eyes and is recognized as the image in the brain, and at the same time, the light irradiates the face of the user (in the case of taking the selfie, the user corresponds to the subject). In other words, the display unit 21 has a function of illuminating the subject (function of emitting auxiliary light) in addition to the function of displaying the image. Note that the emission light from the display unit 21 is called "irradiation light" when the light is referred to from the perspective of the illumination function for the subject.

The photographing state of the subject refers to the state that can variously change in accordance with the environment around the subject at the photographing time; for example, in the case where the subject is a person, the photographing state corresponds to the state of the person that depends on the environment around him, such as the shadow on the face, the gradations of color and the tone of color of the face, etc.

The influence of the irradiation light from the display unit 21 on the photographing state of the subject includes, for example, the influence that depends on the brightness (luminance) of the irradiation light; the shadow appears on or disappears from the face of the person as the subject or the stain or the wrinkle becomes visible or less visible.

The display state of the image in the display unit 21 refers to the state of the luminance of the image or the tone of color of the image. In other words, setting the luminance of the light from the backlight unit 51 to be high for reducing the shadow on the face of the person as the subject in the exposure period at the actual photographing time corresponds to an example of controlling the display state of the image displayed in the display unit 21 in consideration of the influence of the irradiation light from the display unit 21 on the photographing state of the subject.

More specifically, the emission light control unit 75 includes a backlight control unit 81 and a display content control unit 82 as depicted in FIG. 4.

The backlight control unit 81 controls the setting of the backlight unit 51 for controlling the display state of the image displayed in the display unit 21 in consideration of the influence of the irradiation light from the display unit 21 on the photographing state of the subject.

Here, the setting of the backlight unit 51 mainly includes the setting of the luminance, as aforementioned. Moreover, in this embodiment, the LEDs of RGB are employed as the light source of the backlight unit 51. Therefore, the setting of the tone of color is included in the setting of the backlight unit 51. In this embodiment, the backlight control unit 81 can independently and freely decide the various setting of the backlight unit 51 in regard to the luminance and the tone of color.

For example, in the exposure period at the actual photographing time, the backlight control unit 81 can set the tone of color of the backlight unit 51 so that the tone of color of the image displayed in the display unit 21 suits the type of the subject.

Specifically, when the subject is a person, the backlight control unit 81 can set the tone of color of the backlight unit 51 so that the tone of color of the image displayed in the display unit 21 becomes reddish in the exposure period at the actual photographing time. This enables the person to be illuminated with reddish light at the actual photographing time; thus, the data of the captured image of the face, which has ruddy complexion and looks healthy, are recorded in the removable medium 61 as the data for storage.

The display content control unit 82 controls the display content of the image displayed in the display unit 21 in consideration of the influence of the irradiation light from the display unit 21 on the photographing state of the subject.

For example, the display content control unit 82 can control the display content of the image to be displayed in the display unit 21 so that the live view image is displayed before the exposure period at the actual photographing time and predetermined display content in which the irradiation light from the display unit 21 has a predetermined influence on the photographing state of the subject is displayed in the exposure period at the actual photographing time.

Here, as the predetermined display content in which the irradiation light from the display unit 21 has a predetermined influence on the photographing state of the subject, an image with the entire pixels having white color (hereinafter called "entirely white image") can be employed, for example. In the exposure period at the actual photographing time, the luminance of the light from the backlight unit 51 is set so that the luminance of the irradiation light from the display unit 21 is high; this is because, as long as the luminance of the light from the backlight unit 51 is constant, the luminance of the irradiation light from the display unit 21 becomes higher when the display content in the display unit 21 is the entirely white image than in the other cases (the live view image, for example). In other words, the shadow on the face of the person as the subject can be reduced more easily when the display content in the display unit 21 is the entirely white image.

Next, the operation of the image-capture apparatus 1 having the functional structure of FIG. 4 is described.

Specifically, first, the outline of the operation of the image-capture apparatus 1 is described with reference to the timing chart of FIG. 5; then, the image-capture process by the image-capture recording instruction is described as the details of the operation of the image-capture apparatus 1 with reference to the flowchart of FIG. 6.

Figure 5:
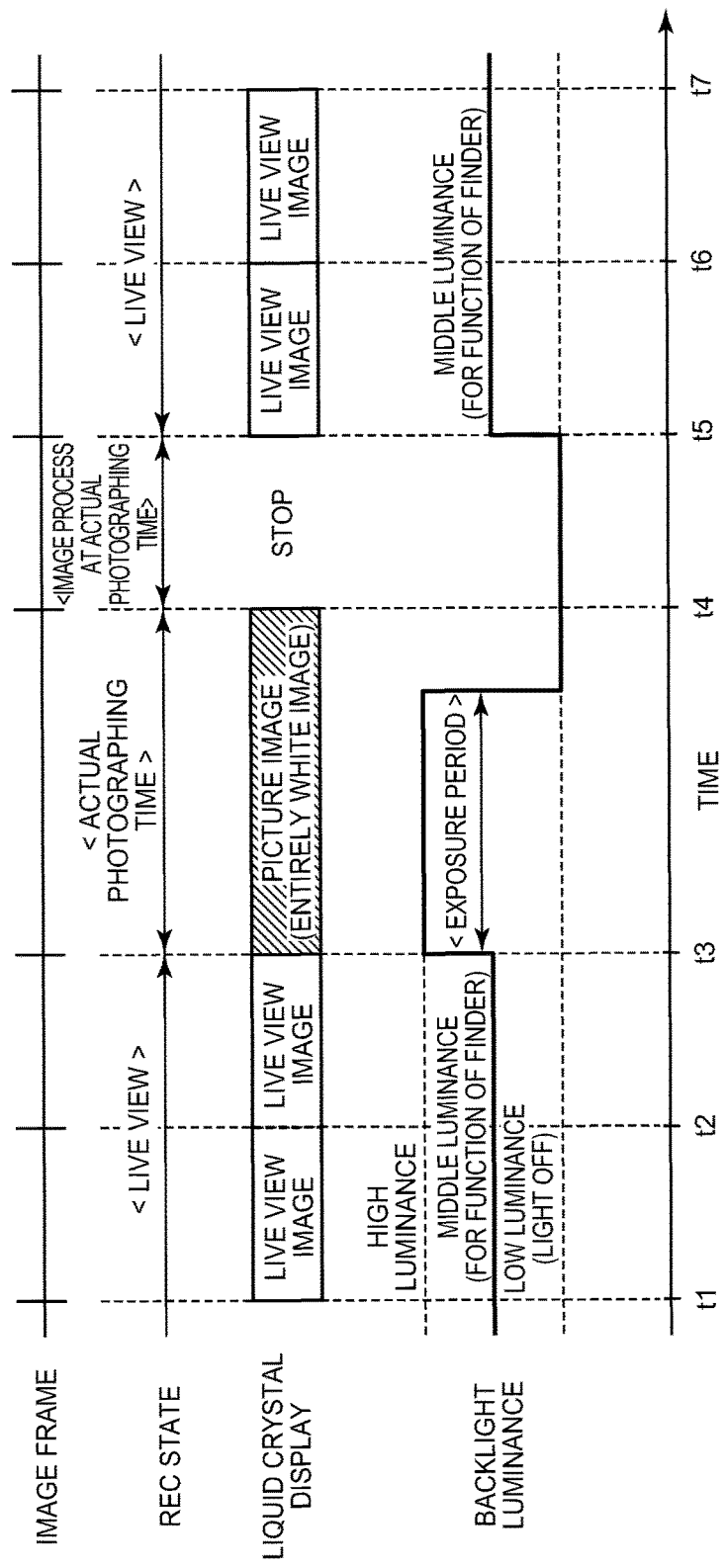
FIG. 5 is a timing chart for describing the outline of the operation of an image-capture apparatus 1 having the functional structure of FIG. 4.

FIG. 5 is a timing chart for describing the outline of the operation of the image-capture apparatus 1 having the functional structure of FIG. 4.

Specifically, the timing chart is shown in the order of the image frame, the REC state, the liquid crystal display, and the luminance of the backlight from the top.

The timing chart of the image frame represents the timing at which each frame is captured. In the example of FIG. 5, the capture (exposure) of one frame is started at each timing of time t1 to time t7, and in the period till the start of the capture of the next frame, the data of the captured image are output and displayed as the live view image in the display unit 21 as necessary.

The timing chart of the REC state represents the transition of the state as to whether there is the recording of the data of the captured images for storage or not. In the example of FIG. 5, the REC state includes the state in which the data of the captured images are not recorded for storage and just displayed as the live view image (hereinafter called "state of live view"), the state after the actual photographing and before the output of the data of the captured image (state including the exposure period), and the state in which various image processes are performed on the data of the captured image at the actual photographing time (hereinafter called "state of image processing at the actual photographing time").

The timing chart of the liquid crystal display represents the transition of the setting of the display content of the image to be displayed in the display unit 21.

The timing chart of the backlight luminance represents the transition of the setting of the luminance of the backlight unit 51.

In FIG. 5, the period from the time t1 to the time t3 is before the image-capture recording instruction is given, i.e., in the stage before the actual photographing time; therefore, the backlight unit 51 is set to have the middle luminance (luminance for the finder function, that is, luminance appropriate for the image reproduction display) and the live view image is set as the display content in the display unit 21.

In the example of FIG. 5, the image-capture recording instruction is given at the time t3 (more exactly, right before the time t3). Thus, the backlight unit 51 is set to have high luminance and the entirely white image is set as the display content in the display unit 21. Although the entirely white image is set as the display content in the display unit 21 in this period in this embodiment, the setting of the entirely white image is not essential as described later in a second embodiment and any picture image in any pattern can be set.

The backlight unit 51 is set to have the high luminance only in the exposure period of the actual photographing time as aforementioned. Upon the end of the exposure period, the state transits to the state of the image process at the actual photographing time; therefore, the luminance of the backlight unit 51 is changed from the high luminance to the low luminance (including light off).

Note that the time t4 is the timing at which the capture of the next frame is started; however, since the state has transited to the state of the image process at the actual photographing time, the display in the display unit 21 is no longer necessary and the stop is set as the display content in the display unit 21.

At the time t5 at which the capture of the next frame is started after the data of the captured image at the actual photographing time are recorded in the removable medium 61, the state returns to the live view image; therefore, in a manner similar to the state in the period between the time t1 and the time t3, the middle luminance is set to the backlight unit 51 and the live view image is set as the display content in the display unit 21.

Figure 6:
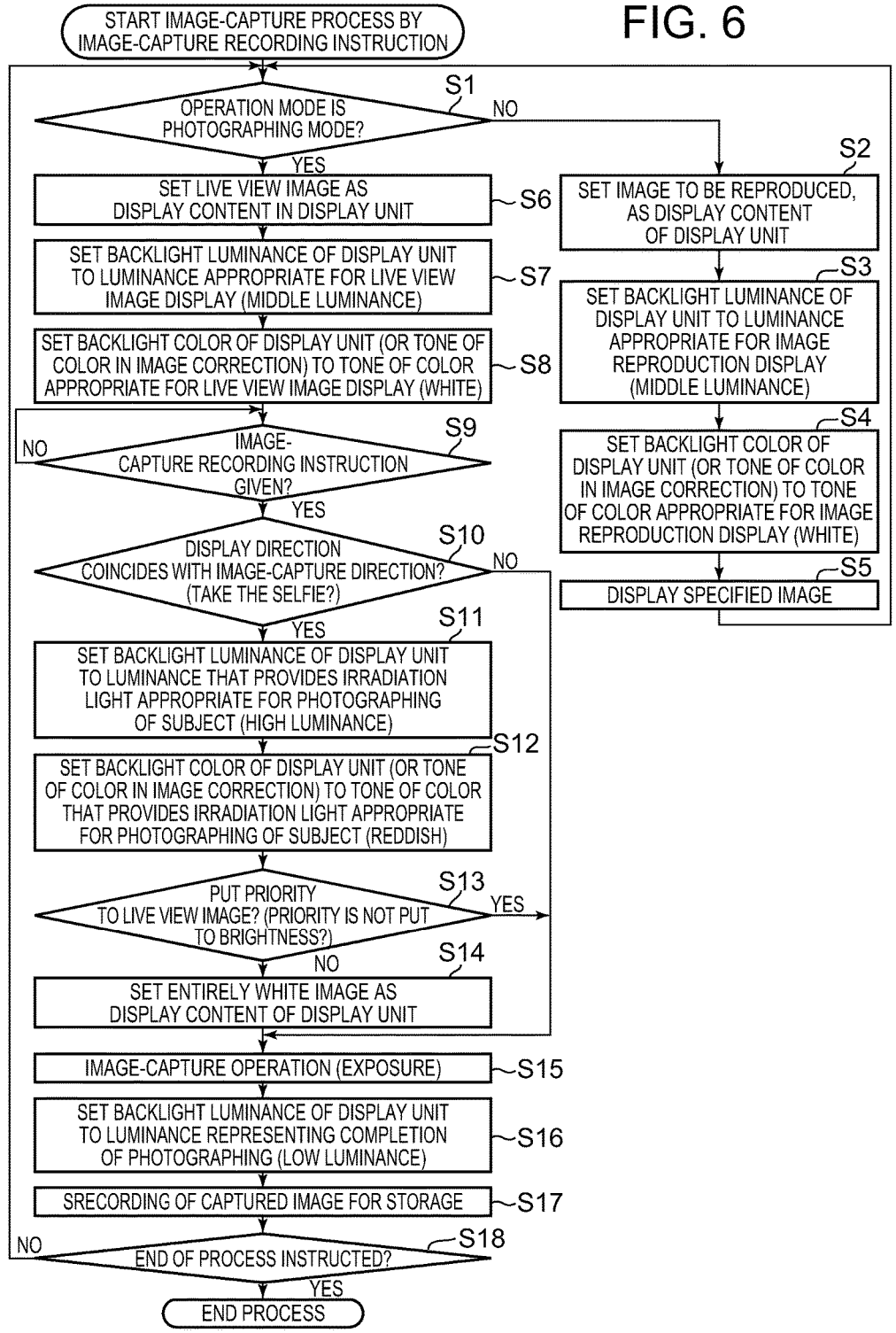
FIG. 6 is a flowchart for describing the flow of a first example of the image-capture process by the image-capture recording instruction, which is executed by the image-capture apparatus having the functional structure of FIG. 4.

Next, with reference to FIG. 6, the image-capture process by the image-capture recording instruction according to the first embodiment is described as the details of the operation of the image-capture apparatus 1 depicted in FIG. 5.

FIG. 6 is a flowchart for describing the flow of the image-capture process by the image-capture recording instruction according to the first embodiment, which is executed by the image-capture apparatus 1 having the functional structure of FIG. 4.

In the example of FIG. 6, the operation mode of the image-capture apparatus 1 includes the photographing mode for photographing the subject and the reproduction mode for reproducing the various images. The mode can be freely switched between the photographing mode and the reproduction mode by a predetermined operation in the operation unit 47.

The image-capture process by the image-capture recording instruction according to the first embodiment is started upon the satisfaction of a predetermined condition after power is input to the image-capture apparatus 1, for example, and then a series of processes as below is executed.

In Step S1, the main control unit 71 of FIG. 4 determines whether the operation mode is the photographing mode or not.

When the operation mode is the reproduction mode, NO is determined in Step S1 and the process advances to Step S2.

In Step S2, the display content control unit 82 sets the image to be reproduced, as the display content in the display unit 21.

In Step S3, the backlight control unit 81 sets the backlight luminance of the display unit 21 (luminance of the backlight unit 51) to be the luminance appropriate for the image reproduction display (middle luminance).

In Step S4, the backlight control unit 81 sets the backlight color of the display unit 21 (tone of color of the backlight unit 51) to be the tone of color appropriate for the image reproduction display (white). The display content control unit 82 may set, in the image correction, the tone of color of the image data to be displayed so that the image has the tone of color appropriate for the image reproduction display (white) in addition to or instead of the backlight control unit 81.

In Step S5, the display control unit 73 displays the image specified as the reproduction target in the display unit 21.

Thus, the process returns to Step S1 and the process of and after Step S1 is repeated.

A series of processes executed in the reproduction mode has been described so far.

Next, a series of processes executed in the photographing mode will be described.

When the operation mode is the reproduction mode, YES is determined in Step S1, and the process advances to Step S6.

In Step S6, the display content control unit 82 sets the live view image as the display content in the display unit 21.

In Step S7, the backlight control unit 81 sets the backlight luminance of the display unit 21 (luminance of the backlight unit 51) to be the luminance appropriate for the image reproduction display (middle luminance).

In Step S8, the backlight control unit 81 sets the backlight color of the display unit 21 (tone of color of the backlight unit 51) to be the tone of color appropriate for the image reproduction display (white). Note that the display content control unit 82 may set, in the image correction, the tone of color of the live view image so that the image has the tone of color appropriate for the image reproduction display (white) in addition to or instead of the backlight control unit 81.

Upon the display of the live view image in the display unit 21 by the display control unit 73, the process advances to Step S9.

In Step S9, the main control unit 71 determines whether the image-capture recording instruction has been given or not.

If the image-capture recording instruction has not yet been given, NO is determined in Step S9 and the process is returned to Step S9. In other words, the determination process in Step S9 is repeated and the image-capture process by the image-capture recording instruction is in the standby state until the image-capture recording instruction is given.

Upon the image-capture recording instruction, YES is determined in Step S9 and the process advances to Step S10.

In Step S10, the main control unit 71 determines whether the direction where the display unit 21 displays coincides with the direction where the image-capture unit 22 captures the image, i.e., the selfie is taken or not.

When the display direction does not coincide with the image-capture direction, i.e., the selfie is not taken and the person other than the user (photographer) is the subject, neither the display content nor the display state of the image in the display unit 21 needs to be controlled; therefore, NO is determined in Step S10 and the process advances to S15 where the normal photographing operation (exposure) is carried out. Note that the process of and after Step S15 is described later.

In contrast to this, when the display direction coincides with the image-capture direction, i.e., the selfie is taken, at least one of the display content and the display state of the image in the display unit 21 needs to be controlled; therefore, YES is determined in Step S10 and the process advances to Step S11 where a series of process as follows is carried out.

In Step S11, the backlight control unit 81 sets the backlight luminance of the display unit 21 (luminance of the backlight unit 51) to be the luminance that provides the irradiation light appropriate for the photographing of the subject (high luminance).

In Step S12, the backlight control unit 81 sets the backlight color of the display unit 21 (tone of color of the backlight unit 51) to be the tone of color that provides the irradiation light appropriate for the photographing of the subject (reddish). Note that the display content control unit 82 may set, in the image correction, the tone of color of the captured image so that the image has the tone of color that provides the irradiation light appropriate for the photographing of the subject (reddish) in addition to or instead of the backlight control unit 81.

In Step S13, the main control unit 71 determines whether priority is put to the live view display or not, i.e., whether priority is not put to the brightness.

In the case of putting priority to the live view display, i.e., the brightness of the irradiation light on the subject is not very important, YES is determined in Step S13 and the process advances to Step S15 where the image-capture operation (exposure) is carried out in a state that the live view image is displayed in the display unit 21 (with high luminance and in reddish tone of color). The process of and after Step S15 is described later.

In the case where priority is not put to the live view display, i.e., priority is put to the brightness of the irradiation light on the subject in particular, NO is determined in Step S13 and the process advances to Step S14.

In Step S14, the display content control unit 82 sets the entirely white image as the display content in the display unit 21.

In this case, in Step S15, the image-capture control unit 72 has the image-capture unit 22 perform the image-capture operation (exposure) in the state that the entirely white image is displayed in the display unit 21 (moreover with high luminance and in reddish tone of color).

The actual photographing is carried out in Step S15 after the process of Step S14, the determination of NO in Step S10, or the determination of YES in Step 13.

After the exposure period at the actual photographing time, the process advances to Step S16.

In Step S16, the backlight control unit 81 sets the backlight luminance of the display unit 21 (luminance of the backlight unit 51) to be the luminance representing the end of the photographing (low luminance and including the light off).

In Step S17, the recording control unit 74 records the data of the captured image at the actual photographing time in the removable medium 61 for storage.

In Step S18, the main control unit 71 determines whether the end of the process has been instructed or not.

In the case where the end of the process has not yet been instructed, NO is determined in Step S18 and the process returns to Step S1, and the process of and after Step S1 is repeated.

In contrast to this, when the end of the process has been instructed, YES is determined in Step S18 and the image-capture process by the image-capture recording instruction according to the first embodiment ends.

The first embodiment has been described so far. Next, a second embodiment is described.

[Second Embodiment]

The image-capture apparatus 1 according to a second embodiment basically has the same hardware structure as the apparatus according to the first embodiment. Therefore, FIG. 3 is also the block diagram depicting the hardware structure of the image-capture apparatus 1 according to the second embodiment.

The image-capture apparatus 1 according to the second embodiment basically has the same functional structure as the apparatus according to the first embodiment. Therefore, FIG. 4 is also the functional block diagram depicting the functional structure of the image-capture apparatus 1 according to the second embodiment.

Therefore, here, the description of the points similar to those of the first embodiment and the description of FIG. 3 and FIG. 4 are omitted, and just the different point from the first embodiment is described.

In the first embodiment described above, in the case of taking the selfie or the like, the control is carried out to display the entirely white image as the control of the display content displayed in the display unit 21 instead of the live view image in consideration of the influence of the irradiation light from the display unit 21 on the photographing state of the subject.

In contrast to this, in the second embodiment, in the case of taking the selfie or the like, the control is carried out to display a predetermined picture image as the control of the display content displayed in the display unit 21 instead of the live view image in consideration of the influence of the irradiation light from the display unit 21 on the photographing state of the subject.

The predetermined picture image is not particularly limited; any kind of image can be employed. Here, two pictures are described as a specific example with reference to FIG. 7 to FIG. 9.

Figure 7:
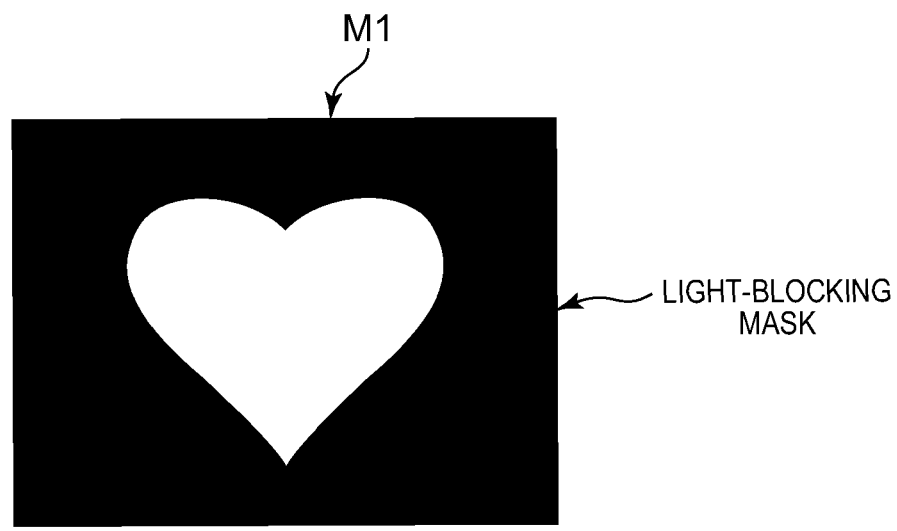
FIG. 7 is a diagram depicting an example of an image of a predetermined picture displayed in the image-capture apparatus of FIG. 1, in which the shape of a bright part of the picture is a predetermined shape considering an eye-catching effect when the subject is a person.

FIG. 7 depicts an example of the predetermined picture image displayed in the display unit 21, in which the shape of a bright part of the image is a predetermined shape in consideration of the eye-catching effect in the case where the subject is a person.

In an image M1 with the predetermined picture in the example of FIG. 7, a bright part of the image (white part of the picture) is formed with the other parts covered with a light-blocking mask, so that the bright part has a shape of a so-called heart-like shape.

Figure 8:
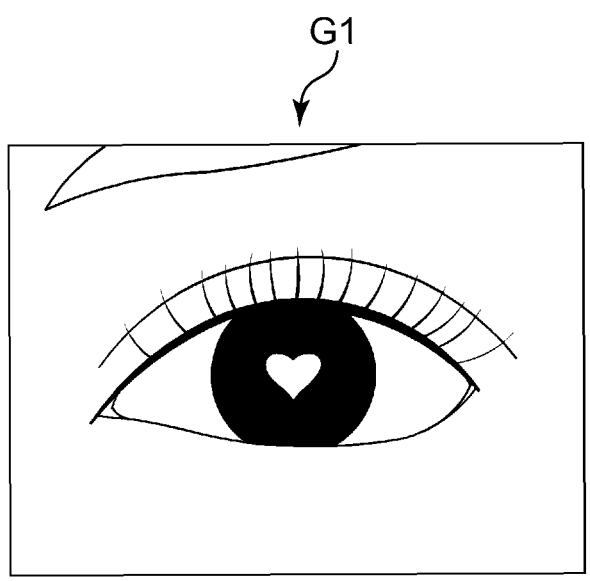
FIG. 8 depicts an example of a captured image obtained when the image of FIG. 7 is displayed in the image-capture apparatus of FIG. 1 in the exposure period at the actual photographing time.

FIG. 8 depicts an example of a captured image obtained when the image M1 of FIG. 7 is displayed in the display unit 21 in the exposure period at the actual photographing time.

When the image M1 of FIG. 7 is displayed in the display unit 21 in the exposure period at the actual photographing time, a captured image G1 can be obtained in which the bright part of the image M1 of FIG. 7 (predetermined picture), i.e., the heart-like shape is reflected in the subject's (person's) eyes.

Thus, when the image-capture apparatus 1 displays the image with the predetermined picture in the exposure period at the actual photographing time, the predetermined picture is irradiated to the subject. If the subject is the person, the predetermined picture is reflected in the person's eyes, in which case the so-called eye-catching (catch-light) effect can be achieved. As a result, the beauty effect can be obtained more.

Figure 9:
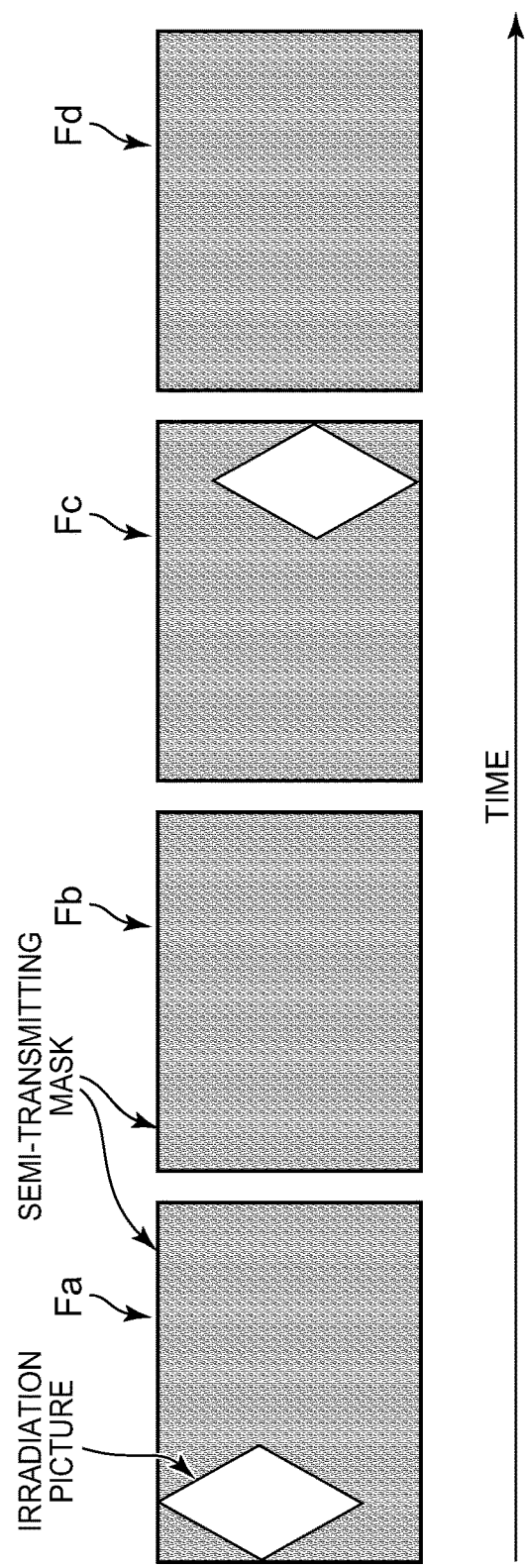
FIG. 9 is a diagram depicting an example of an image of a predetermined picture displayed in the image-capture apparatus of FIG. 1, in which the position of the bright part of the picture changes according to the type or the state of the subject.

FIG. 9 depicts an example of an image as the predetermined picture image displayed in the display unit 21. In this image, the position of the bright part of the image changes depending on the type or the state of the subject.

As the predetermined picture image, images Fa, Fb, Fc, and Fd are sequentially displayed in the display unit 21 in this order as the time passes as depicted in FIG. 9. The bright parts of the images Fa, Fb, Fc, and Fd (white part of the picture) are formed with the other parts covered with a semi-transmitting mask, so that the bright part of the picture (irradiation picture) has a shape like a rhomb. The position of this rhomb (irradiation picture) is different in each of the images Fa, Fb, Fc, and Fd (including the case where the picture itself is not included).

Although not shown, when the images Fa, Fb, Fc, and Fd of FIG. 9 are displayed in this order in the exposure period at the actual photographing time in the continuous shooting or moving image, the irradiation picture to be reflected in the subject's (person's) eyes changes over time, whereby the unique selfie can be taken.

Figure 10:
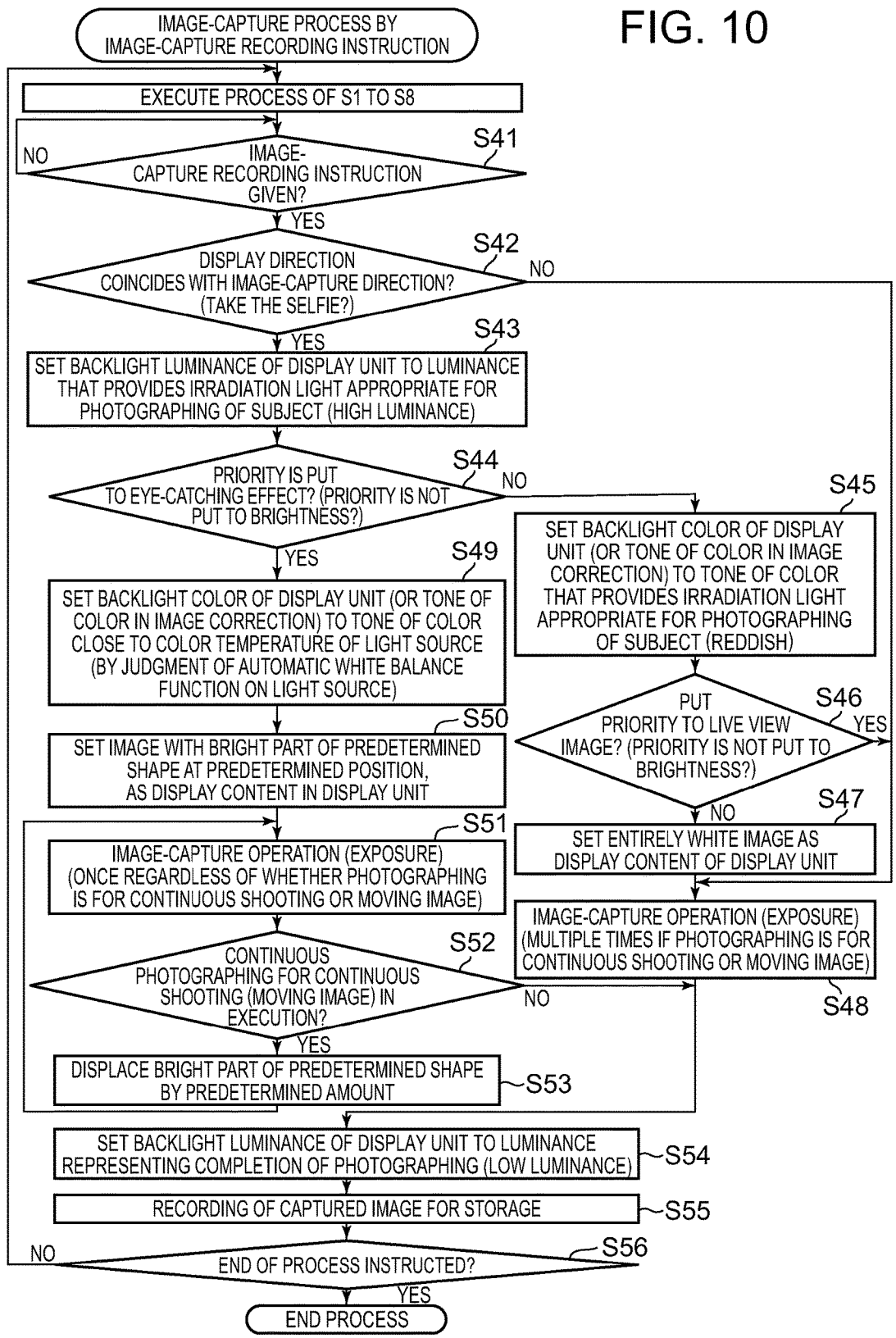
FIG. 10 is a flowchart for describing the flow of a second example of the image-capture process by the image-capture recording instruction, which is executed by the image-capture apparatus having the functional structure of FIG. 4.

Next, the image-capture process by the image-capture recording instruction according to the second embodiment is described as the details of the operation of the image-capture apparatus 1 of the second embodiment with reference to FIG. 10.

FIG. 10 is a flowchart for describing the flow of the image-capture process by the image-capture recording instruction of the second embodiment, which is executed by the image-capture apparatus 1 having the functional structure of FIG. 4.

The image-capture process by the image-capture recording instruction according to the second embodiment is started when the power is input to the image-capture apparatus 1 and a predetermined condition is satisfied. In a manner similar to the first embodiment, a series of processes as below is executed after the process of Steps S1 to S8 (see FIG. 6).

In Step S41, the main control unit 71 determines whether the image-capture recording instruction has been given or not.

When the image-capture recording instruction has not been given, NO is determined in Step S41 and the process returns to Step S41. In other words, the determination process of Step S41 is repeated and the image-capture process by the image-capture recording instruction is in the standby state until the image-capture recording instruction is given.

Upon the image-capture recording instruction, YES is determined in Step S41 and the process advances to Step S42.

In Step S42, the main control unit 71 determines whether the direction where the display unit 21 displays coincides with the direction where the image-capture unit 22 captures the image, i.e., the selfie is taken or not.

When the display direction and the image-capture direction do not coincide, i.e., the selfie is not taken and the person other than the user (photographer) is the subject, neither the display content nor the display state of the image in the display unit 21 needs to be controlled; therefore, NO is determined in Step S42 and the process advances to Step S48 where the normal image-capture operation (exposure) is carried out. Note that the process of and after Step S48 is described later.

In contrast to this, when the display direction and the image-capture direction coincide with each other, i.e., the selfie is taken, at least one of the display content and the display state of the image in the display unit 21 needs to be controlled. Therefore, YES is determined in Step S42 and the process advances to Step S43 where a series of processes as below is executed.

In Step S43, the backlight control unit 81 sets the backlight luminance of the display unit 21 (luminance of the backlight unit 51) to be the luminance that provides irradiation light appropriate for the photographing of the subject (high luminance).

In Step S44, the main control unit 71 determines whether priority is put to the eye-catching effect, i.e., priority is not put to the brightness.

If priority is not put to the eye-catching effect, i.e., priority may be put to the brightness, NO is determined in Step S44 and the process advances to Step S45.

In Step S45, the backlight control unit 81 sets the backlight color of the display unit 21 (tone of color of the backlight unit 51) to be the tone of color that provides the irradiation light appropriate for the photographing of the subject (reddish). Note that the display content control unit 82 may set, in the image correction, the tone of color of the data of the captured image so that the image has the tone of color that provides the irradiation light appropriate for the photographing of the subject (reddish) in addition to or instead of the backlight control unit 81.

In Step S46, the main control unit 71 determines whether priority is put to the live view display, i.e., priority is not put to the brightness.

If the priority is put to the live view display, i.e., the priority is not necessarily put to the brightness of the irradiation light on the subject, YES is determined in Step S46 and the process advances to Step S48. With the live view image displayed in the display unit 21 (with high luminance and in reddish tone of color), the image-capture operation (exposure) is carried out. Note that the process of and after Step S48 is described later.

If the priority is put to the live view display, i.e., the priority is put to the brightness of the irradiation light on the subject in particular, NO is determined in Step S46 and the process advances to Step S47.

In Step S47, the display content control unit 82 sets the display content in the display unit 21 to be the entirely white image.

In this case, in Step S48, the image-capture control unit 72 causes the image-capture unit 22 to perform the image-capture operation (exposure) in a state that the entirely white image is displayed in the display unit 21 (moreover with high luminance and in reddish tone of color).

The actual photographing is carried out in the process of Step S48 after the process of Step S47, the determination of NO in Step S42, or the determination of YES in Step S46. The actual photographing in this case is carried out multiple times for the continuous shooting or the moving image.

After the exposure period at the actual photographing time ends, the process advances to Step S54.

In Step S54, the backlight control unit 81 sets the backlight luminance of the display unit 21 (luminance of the backlight unit 51) to be the luminance that represents the completion of the photographing (low luminance, including the light off).

In Step S55, the recording control unit 74 records the data of the captured image at the actual photographing time in the removable medium 61 for storage.

In Step S56, the main control unit 71 determines whether the end of the process has been instructed or not.

If the end of the process has not yet been instructed, NO is determined in Step S56 and the process returns to Step S1 (FIG. 6), and the process of and after Step S1 is repeated.

In contrast to this, if the end of the process has been instructed, YES is determined in Step S56 and the image-capture process by the image-capture recording instruction according to the second embodiment ends.

A series of processes after the determination of NO in Step S44 has been described because priority is not put to the eye-catching effect.

Next, a series of processes when priority is put to the eye-catching effect, i.e., priority is not put to the brightness is described. In this case, YES is determined in Step S44 and the process advances to Step S49, where a series of processes as below is carried out.

In Step S49, the backlight control unit 81 sets the backlight color of the display unit 21 (tone of color of the backlight unit 51) to be the tone of color close to the color temperature of the light source. This setting is done by the light source determination of the automatic white balance function, whereby the auxiliary light with no sense of discomfort can be obtained. Note that the display content control unit 82 may set, in the image correction, the tone of color of the captured image data to be close to the color temperature of the light source in addition to or instead of the backlight control unit 81.

In Step S50, the display content control unit 82 sets as the display content in the display unit 21, the image having a bright part of a predetermined shape (irradiation picture) at a predetermined position.

In Step S48, the image-capture control unit 72 causes the image-capture unit 22 to perform the image-capture operation (exposure) in the state that the predetermined picture image is displayed in the display unit 21 (moreover with high luminance and in the tone of color close to the color temperature of the light source). In other words, the actual photographing is carried out in this process. As for the actual photographing in this case, the photographing is carried out only once regardless of whether the photographing is for the continuous shooting or the moving image.

In Step S53, the image-capture control unit 72 determines whether the continuous photographing for the continuous shooting (moving image) is carried out or not.

In the case where the continuous photographing for the continuous shooting (moving image) is not carried out, NO is determined in Step S52 and the process of and after Step S54 is executed as the post-process after the actual photographing. Note that since the process of and after Step S54 is as described above, the description is not repeated here.

In contrast to this, in the case where the continuous photographing for the continuous shooting (moving image) is carried out, YES is determined in Step S52 and the process advances to Step S53. In Step S53, the display content display unit 82 displaces the bright part of the predetermined shape (irradiation picture) by a predetermined amount. After that, the process returns to Step S51 and the process of and after Step S51 is repeated.

In other words, as long as the continuous photographing for the continuous shooting (moving image) is carried out, the actual photographing is carried out one by one while the bright part of the predetermined shape (irradiation picture) in the image displayed in the display unit 21 is moved by a predetermined amount. If the continuous photographing for the continuous shooting (moving image) ends (or is determined not to be carried out), NO is determined in Step S52 and the process of and after Step S54 is carried out as the post-process after the actual photographing. Note that since the process of and after Step S54 is as described above, the description is not repeated here.

As thus described, the image-capture apparatus 1 according to the first or second embodiment includes the display unit 21, the image-capture unit 22, and the emission light control unit 75.

The image-capture unit 22 captures the image of the subject. The display unit 21 can be disposed in the range where the emission light can reach the subject whose image is captured by the image-capture unit 22, and displays the image with the use of the emission light.

The emission light control unit 75 executes the control in which at least one of the display content and the display state of the image to be displayed in the display unit 21 at the photographing time is made different in the exposure period at the actual photographing time and the other period in consideration of the influence of the emission light (irradiation light) from the display unit 21 on the photographing state of the subject.

Thus, the emission light control unit 75 has the function of photographing the subject more beautifully with the more appropriate composition in the case of taking the selfie of the photographer himself. Accordingly, the image-capture apparatus having the emission light control unit 75 can be achieved easily with a simple structure.

The emission light control unit 75 of the first or second embodiment can execute the control for setting the live view image as the display content of the display unit 21 at least before the exposure period of the actual photographing time.

Thus, the user can decide the appropriate composition while viewing the live view image or pose in the case of taking the selfie before the actual photographing time. Accordingly, the captured image that is more desirable for the user can be obtained.

The emission light control unit 75 of the image-capture apparatus of the first or second embodiment executes the control in which the display state of the display unit 21 is set to the display state appropriate for viewing of the live view image before the exposure period at the actual photographing time and set to the display state that provides the irradiation light appropriate for the photographing of the subject in the exposure period at the actual photographing time.

Thus, the user can easily view the live view image before the actual photographing, and the emission light appropriate for the photographing of the subject is delivered to the subject at the actual photographing time; therefore, the subject can be photographed more beautifully.

The emission light control unit 75 of the image-capture apparatus of the first or second embodiment can execute the control for producing the display state that provides the irradiation light appropriate for the photographing of the subject by setting at least one of the brightness and the tone of color of the live view image while the live view image is displayed in the exposure period at the actual photographing time.

Thus, by viewing the live view image before the actual photographing, the user can check beforehand the subject to which the irradiation light appropriate for the photographing is delivered, i.e., the subject in the state to be photographed.

The emission light control unit 75 of the image-capture apparatus of the first or second embodiment can execute the control for setting the luminance of the backlight unit 51 of the display unit 21 in the exposure period at the actual photographing time to be higher than the luminance before the exposure period at the actual photographing time.

Thus, the light from the backlight unit 51 with the increased luminance is delivered to the subject as the emission light at the exposure time at the actual photographing time; therefore, in the case where the subject is a person, the face of the person is brightened and the shadow is reduced from the face, whereby the more beautiful image of the face can be captured.

Moreover, the luminance may be increased just in the period where the image is captured; accordingly, the luminance is set high only in the exposure period at the actual photographing time. As a result, when the subject is a person, the person feels dazzling just instantly, so that this specification does not burden the person.

Here, for increasing the luminance of the backlight unit 51, the number of lights of the LED or the like may be increased. In this case, by linking the color temperature of the LED with the automatic white balance judgment, the beauty effect, etc. become more remarkable.

The emission light control unit 75 of the image-capture apparatus according to the first or second embodiment can execute the control for setting the tone of color of the display unit 21 to be the tone of color according to the type of the subject in the exposure period at the actual photographing time.

Thus, the emission light in the tone of color according to the type of the subject is delivered to the subject in the exposure period at the actual photographing time; therefore, the more beautiful image of the subject can be captured.

In the case where the subject is a person, the emission light control unit 75 of the image-capture apparatus according to the first or second embodiment can execute the control for setting the tone of color of the display unit to be reddish in the exposure period at the actual photographing time as compared with the tone of color at other than the exposure period.

Thus, the emission light that is reddish is delivered to the person as the subject in the exposure period at the actual photographing time; therefore, the image of the person which has ruddy complexion (looks healthy) can be captured.

The emission light control unit 75 of the image-capture apparatus according to the first or second embodiment can execute the control for setting the live view image as the display content in the display unit 21 before the exposure period at the actual photographing time and setting predetermined display content in which the emission light from the display unit 21 displaying the image has a predetermined influence on the photographing state of the subject in the exposure period at the actual photographing time.

Thus, in the exposure period at the actual photographing time, the control is executed so that the emission light from the display unit 21 displaying the image has a predetermined influence on the photographing state of the subject in regard to not just the display state but also the display content, whereby the more beautiful image of the subject can be captured.

In the exposure period at the actual photographing time, the emission light control unit 75 of the image-capture apparatus according to the second embodiment can execute the control for setting as the predetermined display content in the display unit 21, an image in which a relatively bright part has a predetermined shape considering the eye-catching effect when the subject is a person.

Thus, since the eye-catching picture is seen beautifully in the eyes of the person as the subject, the vivid image of the subject can be captured. In other words, the effect as the beauty function becomes remarkable.

The emission light control unit 75 of the image-capture apparatus according to the second embodiment can execute the control for setting as the predetermined display content in the display unit 21, the image in which the position of the relatively bright part is changed depending on at least one of the type and the state of the subject in the exposure period at the actual photographing time.

Thus, a group of continuously taken images or moving images in which the subject is the person with the picture in the eyes changing can be obtained. In other words, the effect as the beauty function relative to the moving image or continuous shooting becomes remarkable.

In the operation mode in which the subject photographs himself (selfie mode), the emission light control unit 75 of the image-capture apparatus according to the first or second embodiment can execute the control for setting the display state of the display unit 21 to be the display state that can provide the emission light appropriate for the photographing of the person.

Thus, by selecting the selfie mode, the user can have the emission light appropriate for the photographing delivered to the user (subject); therefore, the image of the user with the beautiful face can be captured.

In the first or second embodiment, the display unit 21 can have the display plane rotated between the image-capture direction and its opposite direction. The image-capture apparatus further includes the main control unit 71 that, when the display plane is directed to the image-capture direction, determines that the mode is the operation mode in which the subject photographs himself.

This is convenient because the user can set the selfie mode automatically simply by switching the display plane of the display unit 21 in the image-capture direction.

Moreover, in the selfie mode, the display plane is certainly directed to the subject; therefore, it is possible to check the composition when taking the selfie with the use of the displayed image on the display plane and moreover to execute the photographing operation certainly in which the face of the subject is photographed more beautifully by using the emission light from the display plane.

Note that the present invention is not limited to the above embodiments and the modifications and improvements within the range that can attain the object of the present invention are included in the scope of the present invention.

For example, in the above embodiment, the display unit 21 is the liquid crystal display apparatus; however, the present invention is not limited thereto. The display unit 21 may be a display apparatus of a self-light-emitting device type, such as an organic EL (Electro-Luminescent) display apparatus.

In this case, the display content or the display state of the image in the display unit 21 is controlled with respect to the self-light-emitting device.

For example, in the case of taking the selfie, the image-capture direction coincides with the display direction in the above embodiment; however, the directions are not necessarily the same. In other words, the display unit 21 may be disposed in the range where the emission light reaches the subject to be photographed by the image-capture unit 22.

The timing of executing the control of the display content or the display state of the image to be displayed in the display unit 21 is, for example, not limited to the timing described in the above embodiment and may be determined arbitrarily. Specifically, for example, the aforementioned control may be executed only when the beauty function is selected, the face is detected, the subject is a female, the size of the face of the subject is larger than a certain size, or any other conditions are held.

Although the image-capture apparatus 1 to which the present invention is applied is a digital camera in the above embodiment, the present invention is not limited thereto.

For example, the present invention is applicable to general electronic appliances having an image-capture function and a display function. Specifically, for example, the present invention is applicable to a laptop personal computer, a printer, a TV set, a video camera, a smartphone, a portable navigation apparatus, a cellular phone, a portable game machine, etc.

A series of processes described above can be executed using either hardware or software.

In other words, the functional structure of FIG. 4 is just an example and the functional structure of the present invention is not limited thereto. The functional blocks for achieving the aforementioned function are not limited to those shown in the example of FIG. 2 as long as the image-capture apparatus 1 has the function that can execute the aforementioned series of processes.

One functional block may be composed of hardware alone or software alone, or the combination of those.

In the case of executing a series of processes using software, the programs constituting the software is installed from the network or the storage medium to the computer.

The computer may be a computer incorporated in a dedicated hardware apparatus. The computer may alternatively be a computer capable of executing various functions by having various programs installed therein, for example, a versatile personal computer.

The storage medium having such a program is not just composed of the removable medium 61 of FIG. 3 distributed separate from the apparatus main body for providing the user with the program but also of the storage medium or the like to be provided for the user in the state that the medium is incorporated in the apparatus main body in advance. The removable medium 61 is, for example, a magnetic disk (including a floppy disk), an optical disk, an optomagnetic disk, or the like. The optical disk is composed of, for example, a CD-ROM (Compact Disk-Read Only Memory), a DVD (Digital Versatile Disk), or the like. The optomagnetic disk is composed of an MD (Mini-Disk) or the like. Moreover, the storage medium provided for the user in the state of being incorporated in the apparatus main body in advance is composed of, for example, the ROM 42 of FIG. 3 having the program recorded therein or the hard disk included in the storage unit 48 of FIG. 3.

In this specification, the steps describing the programs recorded in the storage medium may be processed either in time series along the order or not, or in parallel or individually.

The embodiments of the present invention have been described so far. The embodiments are just examples and do not limit the technical scope of the present invention. Various other embodiments can be employed and various changes including omission and replacements can be carried out in the range not departing from the scope of the present invention. The above embodiments and the modifications thereof are included in the scope and content of the present invention described in the present specification, etc. and included in the invention disclosed in the scope of claims and the equivalents.

What is claimed is:

1. An image-capture apparatus comprising:
   an image-capture device that captures an image of a subject;
   a display that can be disposed in a range where emission light from the display reaches the subject whose image is captured by the image-capture device and that can display an image captured by the image-capture device using the emission light; and
   a processor that executes control to set, as a display content of the display, an image in which a relatively bright part has a predetermined shape considering an eye-catching effect when the subject is a person in an exposure period at an actual photographing time.

2. The image-capture apparatus according to claim 1, wherein the processor executes control to set a display state of the display to be a display state appropriate for viewing of a live view image before receiving an image-capture instruction and, in response to receiving the image-capture instruction, to change the display state of the display to a display state that provides emission light appropriate for photographing of the subject.

3. The image-capture apparatus according to claim 2, wherein the processor executes the control to set the display state that provides the emission light appropriate for the photographing of the subject in the exposure period at the actual photographing time in response to receiving the image-capture instruction.

4. The image-capture apparatus according to claim 1, wherein:
   the display displays the image by emitting emission light using a backlight thereof; and
   the processor executes control to set a luminance of the backlight of the display in the exposure period at the actual photographing time to be higher than the luminance of the backlight of the display before the exposure period at the actual photographing time.

5. The image-capture apparatus according to claim 1, wherein the processor executes control to set a tone of color of the display based on a type of the subject in the exposure period at the actual photographing time.

6. The image-capture apparatus according to claim 1, wherein the processor executes control to set a tone of color of the display to be more reddish in the exposure period at the actual photographing time than the tone of color of the display in another period at the actual photographing time.

7. The image-capture apparatus according to claim 1, wherein the processor executes control to set a display state of the display to be a display state that provides emission light appropriate for photographing a person when an operation mode is set in which the subject photographs himself.

8. The image-capture apparatus according to claim 7, wherein:
   a display plane of the display is rotatable between an image-capture direction and a direction opposite to the image-capture direction; and
   the processor determines that the operation mode in which the subject photographs himself is set when the display plane is directed in the image-capture direction.

9. An image-capture apparatus comprising:
   an image-capture device that captures an image of a subject;
   a display that can be disposed in a range where emission light from the display reaches the subject whose image is captured by the image-capture device and that can display an image captured by the image-capture device using the emission light; and
   a processor that executes control to change a position of a relatively bright part of the image displayed on the display depending on at least one of a type and a state of the subject in an exposure period at an actual photographing time.

10. An image-capture control method for executing control by an image-capture apparatus, the image-capture apparatus including an image-capture device that captures an image of a subject, and a display that can be disposed in a range where emission light from the display reaches the subject whose image is captured by the image-capture device and that can display an image captured by the image-capture device using the emission light, and the method comprising:
    setting, as a display content of the display, an image in which a relatively bright part has a predetermined shape considering an eye-catching effect when the subject is a person in an exposure period at an actual photographing time.

11. An image-capture control method for executing control by an image-capture apparatus, the image-capture apparatus including an image-capture device that captures an image of a subject, and a display that can be disposed in a range where emission light from the display reaches the subject whose image is captured by the image-capture device and that can display an image captured by the image-capture device using the emission light, and the method comprising:

changing a position of a relatively bright part of the image displayed on the display depending on at least one of a type and a state of the subject in an exposure period at an actual photographing time.

12. A non-transitory computer-readable recording medium having a program recorded thereon, the program being executable by a computer which controls an image-capture apparatus including an image-capture device that captures an image of a subject, and a display that can be disposed in a range where emission light from the display reaches the subject whose image is captured by the image-capture device and that can display an image captured by the image-capture device using the emission light, the program being executable to control the computer to perform functions comprising:

setting, as a display content of the display, an image in which a relatively bright part has a predetermined shape considering an eye-catching effect when the subject is a person in an exposure period at an actual photographing time.

13. A non-transitory computer-readable recording medium having a program recorded thereon, the program being executable by a computer which controls an image-capture apparatus including an image-capture device that captures an image of a subject, and a display that can be disposed in a range where emission light from the display reaches the subject whose image is captured by the image-capture device and that can display an image captured by the image-capture device using the emission light, the program being executable to control the computer to perform functions comprising:

changing a position of a relatively bright part of the image displayed on the display depending on at least one of a type and a state of the subject in an exposure period at an actual photographing time.

* * * * *